United States Patent
Kobayashi et al.

(10) Patent No.: US 7,162,284 B2
(45) Date of Patent: Jan. 9, 2007

(54) MOBILE PHONE, ANALYSIS DEVICE INCLUDED THEREIN, AND ANALYSIS METHOD

(75) Inventors: Naoki Kobayashi, Tokyo (JP); Eiji Hankui, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 10/454,628

(22) Filed: Jun. 5, 2003

(65) Prior Publication Data

US 2003/0228891 A1 Dec. 11, 2003

(30) Foreign Application Priority Data

Jun. 5, 2002 (JP) ............................. 2002-164839

(51) Int. Cl.
*H04M 1/00* (2006.01)

(52) U.S. Cl. ............... 455/575.5; 455/550; 455/575.1; 343/702

(58) Field of Classification Search ............. 455/575.5, 455/550, 348, 575.1; 343/702, 718, 742
See application file for complete search history.

(56) References Cited

U.S. PATENT DOCUMENTS

| | | | |
|---|---|---|---|
| 5,905,467 A | | 5/1999 | Narayanaswamy et al. |
| 6,005,525 A | * | 12/1999 | Kivela .................. 343/702 |
| 6,011,519 A | * | 1/2000 | Sadler et al. ............. 343/742 |
| 6,118,409 A | | 9/2000 | Pietsch et al. |
| 6,336,037 B1 | | 1/2002 | Sekine et al. |
| 6,434,372 B1 | * | 8/2002 | Neagley et al. ............ 455/106 |
| 2002/0068602 A1 | * | 6/2002 | Kuriyama et al. .......... 455/550 |
| 2003/0013469 A1 | * | 1/2003 | Forrester .................. 455/506 |

FOREIGN PATENT DOCUMENTS

| | | |
|---|---|---|
| EP | 1 098 453 A2 | 5/2001 |
| EP | 1 206 034 A2 | 5/2002 |
| GB | 2 355 155 A | 4/2001 |
| JP | 1060027 A | 3/1989 |
| JP | H03-280625 A | 12/1991 |
| JP | 2000-261532 A | 9/2000 |
| JP | 2002-217803 A | 8/2002 |
| JP | 2002-261665 A | 9/2002 |
| WO | WO 97/23016 A1 | 6/1997 |
| WO | WO 01/15267 A1 | 3/2001 |
| WO | WO 01/71940 A2 | 9/2001 |

* cited by examiner

*Primary Examiner*—Quochien B. Vuong
*Assistant Examiner*—Michael Chu
(74) *Attorney, Agent, or Firm*—Sughrue Mion, PLLC

(57) ABSTRACT

A mobile phone has an upper antenna at the top of a casing constituting a body and a lower antenna at the bottom of the casing. The mobile phone includes an influence-on-antenna evaluation unit for evaluating the influence of the ambient environment on each of the antennas by determining an input impedance (Z) of each antenna at predetermined time intervals during connection and by comparing the determined input impedance with a predetermined input-impedance reference value (Z0). Transmission power corresponding to the amount of radio waves radiated is supplied to the antenna that is less affected by the ambient environment and transmission power is not supplied to the antenna that is more affected by the ambient environment.

9 Claims, 4 Drawing Sheets

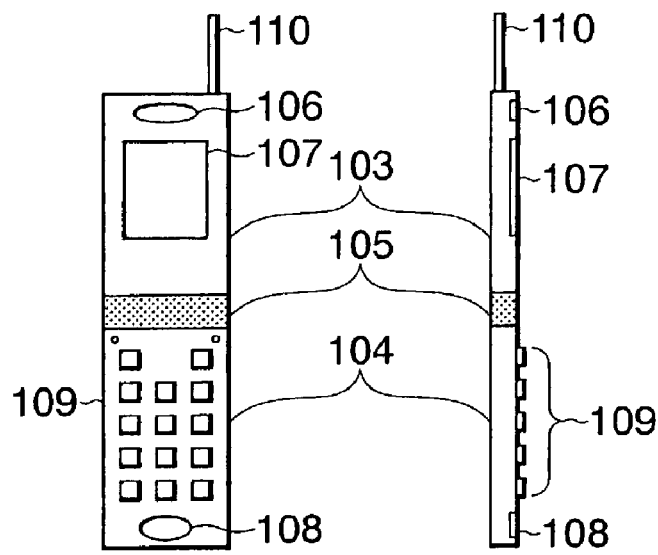
FIG. 1A
(PRIOR ART)
FIG. 1B
(PRIOR ART)
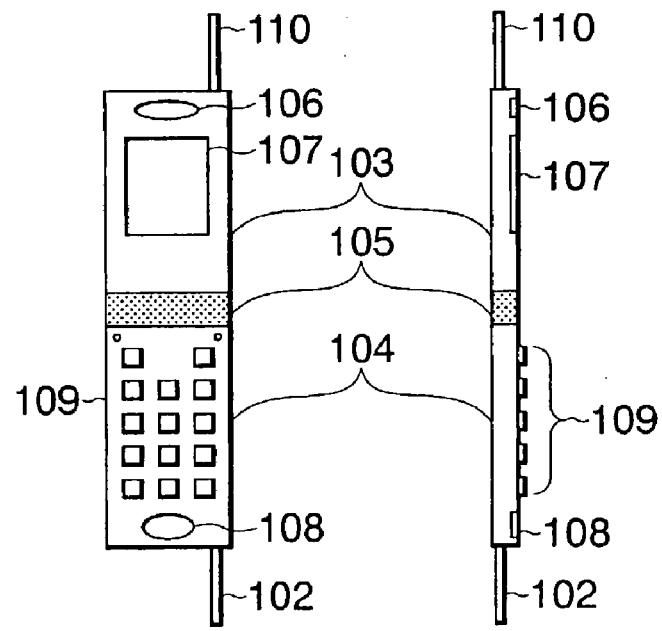
FIG. 2A
FIG. 2B

MOBILE PHONE, ANALYSIS DEVICE INCLUDED THEREIN, AND ANALYSIS METHOD

BACKGROUND OF THE INVENTION

The present invention relates to mobile wireless equipment typified by, for example, mobile phones. More particularly, the present invention relates to a mobile phone having higher antenna performance, an analysis device included in the mobile phone, and an analysis method used in the device.

The development of compact embedded antennas has become increasingly desired in recent years as mobile phones have become smaller. Well-known antennas that are in common use include linear antennas, such as monopole antennas, helical antennas, and inverted L antennas. The monopole antenna and the helical antenna are attached to the top of the casing of a mobile phone and protrude from the casing; whereas the inverted L antenna is attached along the casing of a mobile phone, thus being suitable as an embedded antenna.

Foldable mobile phones whose operation panel and display are protected from damage in transit are known. Each foldable mobile phone has two casings that are connected by a hinge part for folding. The antenna is attached to one of the casings.

FIG. 1A is a front view of a known foldable mobile phone and FIG. 1B is a cross-sectional view thereof. Referring to FIGS. 1A and 1B, the foldable mobile phone has an upper casing 103 including a display 107 and a speaker 106, a lower casing 104 including a keyboard 109 and a microphone 108, and a hinge part 105 that connects the upper casing 103 and the lower casing 104 for allowing them to be closed. An antenna 110 is usually attached to the top of the upper casing 103.

A printed circuit board (not shown) is provided in the upper casing 103 or the lower casing 104. The printed circuit board has a transmission unit for supplying transmission power, a power transfer unit for transferring the power to the antenna 110, and a power amplifying unit for amplifying the power. The transmission power is usually supplied to the antenna through an output terminal of the power amplifying unit. A matching circuit (now shown) is provided between the power amplifying unit and the antenna. The matching circuit is designed such that the input impedance of the antenna matches the impedance at the output terminal of the power amplifying unit.

As described above, a common mobile phone is designed such that the input impedance of the antenna is in a matching condition.

Generally, a user making a call by using a mobile phone (during connection) holds the body of the mobile phone with his/her hand to hold the speaker over his/her ear. Since the mobile phone including the antenna is close to the user, the input impedance of the antenna during connection varies depending on the influence of the human body.

For example, with a mobile phone having the antenna at the top of the upper casing, the input impedance of the antenna mainly varies in accordance with the influence of the head of the user. In contrast, with a mobile phone having the antenna at the bottom of the lower casing, the input impedance of the antenna mainly varies in accordance with the influence of the hand of the user.

Although the influence of the human body is described above, the impedance characteristics of the antenna generally vary during connection in accordance with the influence of the ambient environment, such as scattering material (including dielectric material, metallic bodies, and so on) around the mobile phone. The amount of variation in impedance of the antenna generally increases as the influence of the ambient environment increases, so that a predetermined matching condition tends to vary. In a mismatched condition, the power transferred from the power amplifying unit to the antenna returns. From the view point of the antenna, the returning power is return loss, which causes the power supplied to the antenna to decrease. As a result, the communication characteristics, such as antenna gain, of the mobile phone are reduced.

In this manner, a large variation in the impedance of the antenna and a large return loss cause the antenna gain to decrease. Accordingly, the influence of the return loss on the mobile phone should normally be reduced as much as possible in order to maintain the antenna gain, by optimizing the matching circuit and so on in view of an estimated variation in impedance of the antenna during connection.

However, since the variation in impedance of the antenna strongly depends on the way the mobile phone is held by the user, which differs from person to person, the actual variation in impedance may exceed the pre-estimated variation in impedance. In particular, a known mobile phone generally has a single transmission antenna, so that the user has no choice other than to use a reduced-gain antenna.

SUMMARY OF THE INVENTION

Accordingly, it is an object of the present invention to provide a mobile phone having larger antenna gain, an analysis device included in the mobile phone for acquiring larger antenna gain, and an analysis method used in the device. This is achieved by sequentially selecting an antenna having the least influence of the ambient environment and by utilizing the selected antenna as a transmission antenna during connection.

The present invention provides, in its first aspect, a mobile phone having an upper antenna at the top of a casing constituting a body and having a lower antenna at the bottom of the casing. The mobile phone includes an influence-on-antenna evaluation unit for evaluating the influence of the ambient environment on each of the antennas by determining an input impedance (Z) of each antenna at predetermined time intervals during connection and by comparing the determined input impedance with a predetermined input-impedance reference value (Z0). Transmission power corresponding to the amount of radio waves radiated is supplied to the antenna that is less affected by the ambient environment and transmission power is not supplied to the antenna that is more affected by the ambient environment.

BRIEF DESCRIPTION OF THE DRAWINGS

FIG. 1A is a front view showing the structure of a known mobile phone;

FIG. 1B is a cross-sectional view of the known mobile phone in FIG. 1A;

FIG. 2A is a front view showing the structure of a mobile phone according to an embodiment of the present invention;

FIG. 2B is a cross-sectional view of the mobile phone in FIG. 2A;

DESCRIPTION OF THE PREFERRED EMBODIMENTS

Embodiments of the present invention will now be described with reference to the attached drawings. FIG. 2A is a front view and FIG. 2B is a cross-sectional view of a mobile phone according to an embodiment of the present invention. Referring to FIGS. 2A and 2B, the mobile phone has an upper antenna 101 at the top edge of an upper casing 103 and has a lower antenna 102 at the bottom edge of a lower casing 104. The mobile phone of the present invention is characterized by this antenna structure, compared with known mobile phones. Although the two antennas protrude from the upper casing 103 and the lower casing 104, respectively, in this embodiment, the upper antenna 101 and the lower antenna 102 may be embedded in the upper casing 103 and the lower casing 104, respectively.

Figure 3:
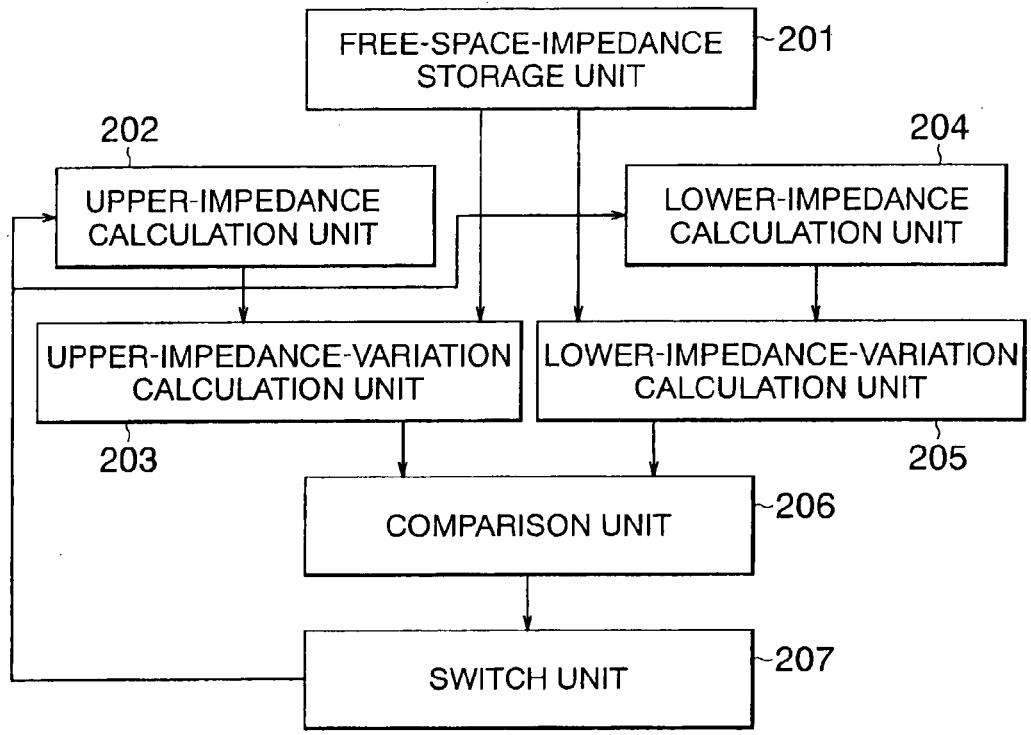
FIG. 3 is a block diagram showing the functional structure of the analysis device included in the mobile phone according to the embodiment of the present invention.

The functional structure of the mobile phone according to this embodiment will now be described. FIG. 3 is a block diagram showing the functional structure of the mobile phone according to this embodiment.

A free-space-impedance storage unit 201 stores impedance reference values. The free-space-impedance storage unit 201 stores, for example, input impedances $Z_{free}(\omega_i)$ (the symbol will be described below) of antennas located in free space. The input impedances $Z_{free}(\omega_i)$ are calculated experimentally or by electromagnetic analysis at a plurality of points within a predetermined frequency band by using the casing structure of the mobile phone according to this embodiment. Specifically, the free-space-impedance storage unit 201 stores values given by the following mathematical expression (1):

$$Z_{free}(\omega_i),\ \omega_{min} < \omega_i < \omega_{Max},\ i=1, \ldots, N \tag{1}$$

In this mathematical expression (1), $\omega_i$ denotes a predetermined angular frequency, $\omega_{min}$ denotes a minimum angular frequency within the frequency band, $\omega_{max}$ denotes a maximum angular frequency within the frequency band, and N denotes an integer.

An upper-impedance calculation unit 202 calculates upper-antenna impedances at a plurality of points within a predetermined frequency band. Specifically, the upper-impedance calculation unit 202 measures a voltage $V_{up}$ and a current $I_{up}$ of an upper-antenna feed unit at regular time intervals during connection to calculate the ratio of the voltage and the current. More specifically, the upper-impedance calculation unit 202 calculates input impedances $Z_{up}(\omega_i)$ of the upper antenna using the following mathematical expression (2):

$$Z_{up}(\varpi_i) = \frac{V_{up}(\varpi_i)}{I_{up}(\varpi_i)},\ i=1, \ldots, N \tag{2}$$

An upper-impedance-variation calculation unit 203 calculates square differences (corresponding to the variations) between the input impedances $Z_{free}(\omega_i)$ in free space and the input impedances $Z_{up}(\omega_i)$ of the upper antenna within a predetermined frequency band based on the upper-antenna impedances calculated by the upper-impedance calculation unit 202. Specifically, the upper-impedance-variation calculation unit 203 calculates an upper-impedance variation $\Delta Z_{up}$ using the following mathematical expression (3):

$$\Delta Z_{up} = \sum_{i=1}^{N} \|Z_{up}(\varpi_i) - Z_{free}(\varpi_i)\|^2 \tag{3}$$

This variation is used as an index indicating the degree of influence of the ambient environment on the upper antenna. A small variation means a low degree of influence of the ambient environment.

A lower-impedance calculation unit 204 calculates lower-antenna impedances at a plurality of points within a predetermined frequency band. Specifically, the lower-impedance calculation unit 204 measures a voltage $V_{udr}$ and a current $I_{udr}$ of a lower-antenna feed unit at regular time intervals during connection to calculate the ratio of the voltage and the current. More specifically, the lower-impedance calculation unit 202 calculates input impedances $Z_{udr}(\omega_i)$ of the lower antenna using the following mathematical expression (4):

$$Z_{udr}(\varpi_i) = \frac{V_{udr}(\varpi_i)}{I_{udr}(\varpi_i)},\ i=1, \ldots, N \tag{4}$$

A lower-impedance-variation calculation unit 205 calculates square differences (corresponding to the variations) between the input impedances $Z_{free}(\omega_i)$ in free space and the input impedances $Z_{udr}(\omega_i)$ of the lower antenna within a predetermined frequency band based on the lower-antenna impedances calculated by the lower-impedance calculation unit 204. Specifically, the lower-impedance-variation calculation unit 205 calculates a lower-impedance variation $\Delta Z_{udr}$ using the following mathematical expression (5):

$$\Delta Z_{udr} = \sum_{i=1}^{N} \|Z_{udr}(\varpi_i) - Z_{free}(\varpi_i)\|^2 \tag{5}$$

A comparison unit 206 compares the upper-impedance variation $\Delta Z_{up}$ calculated by the upper-impedance-variation calculation unit 203 with the lower-impedance variation $\Delta Z_{udr}$ calculated by the lower-impedance-variation calculation unit 205 to determine the degree of influence of the ambient environment on the antennas. Specifically, the comparison unit 206 calculates Max (maximum) and Min (minimum), which are factors for selecting either of the antennas, using the following mathematical expression (6):

if $\Delta Z_{up} > \Delta Z_{udr}$ then Max=1, Min=0, else Max=0, Min=1     (6)

A switch unit 207 switches on or off the upper antenna and the lower antenna based on Max and Min calculated by the comparison unit 206. At the start of talking, both the upper antenna and the lower antenna are switched on and power is supplied from a power amplifying unit to both antennas. The switch unit 207 performs switching based on the result given by the following mathematical expression (7) during an observation period $\Delta t$. For example, when Max is equal to one (Max=1), the upper antenna is switched off, while the lower antenna is switched on (this state is hereinafter expressed as switch$_{up}$=off). When Max is equal to zero (Max=0), the lower antenna is switched off, while the upper antenna is switched on (this state is hereinafter expressed as switch$_{udr}$=off). Power is supplied only to the antenna that is switched on.

If Max=1 then switch$_{up}$=off, else switch$_{udr}$=off     (7)

Figure 4:
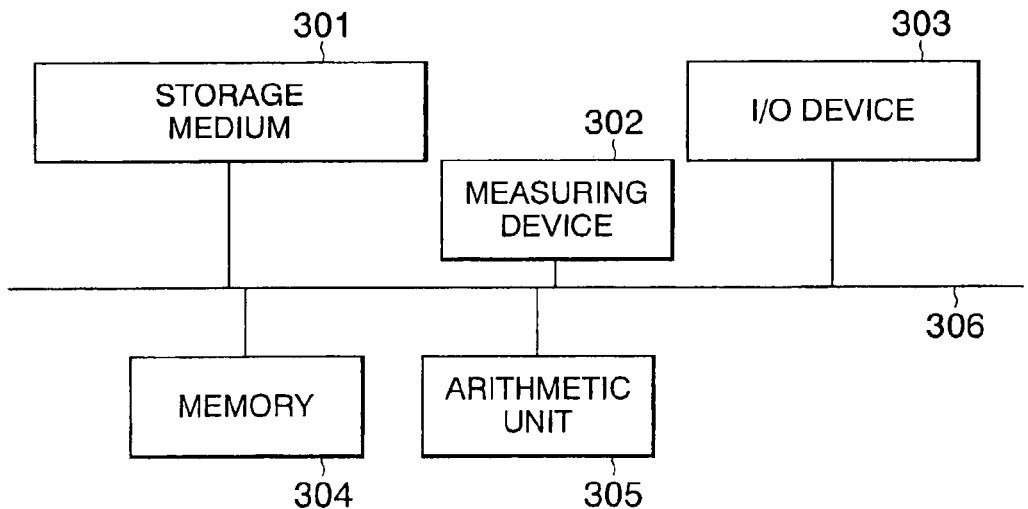
FIG. 4 is a diagram showing the hardware configuration of the mobile phone according to the embodiment of the present invention.

The hardware configuration of the mobile phone according to the embodiment will now be described. FIG. 4 is a diagram showing the hardware configuration of the mobile phone according to the embodiment of the present invention. Referring to FIG. 4, the mobile phone has a storage medium 301 that stores necessary data, a measuring device 302 for measuring required physical values, and a processing unit. The processing unit includes an I/O device 303 for inputting and outputting data and measured values, a memory 304 for storing the data and the measured values read from the I/O device, and an arithmetic unit 305 for controlling the overall processing unit and performing calculations. A connecting path 306 connects the above components.

The principle of the mobile phone according to the embodiment of the present invention will now be described. The input impedances of the antenna of a mobile phone are usually performance indices dependent on an antenna element and a casing attached to the antenna element. The input impedance is specifically given by the following mathematical expression (8) by using a voltage $V_{free}$ and a current $I_{free}$ of the connecting part of the antenna element, serving as a feed unit, and the casing, where $\omega$ denotes the angular frequency.

$$Z_{free}(\varpi) = \frac{V_{free}(\varpi)}{I_{free}(\varpi)} \quad (8)$$

The input impedances of the antenna of a mobile phone in free space are measured or calculated experimentally or by electromagnetic analysis. An output impedance $Z_{out}(\omega)$ at the power amplifying unit usually matches the input impedance $Z_{free}(\omega)$ of the antenna at a predetermined frequency within a frequency band so that power supplied from the power amplifying unit to the antenna does not return. When an impedance matching circuit is used, an impedance $Z_{matick}(\omega)$ of the antenna viewed from the power amplifying unit is approximately given by the following mathematical expression (9).

$Z_{matick}(\omega) = Z_{out}(\omega)$     (9)

Since a human body near the antenna has an influence for the input impedance of the antenna during actual talking, as described above, the input impedance of the antenna varies to a greater degree than the input impedance in free space. The input impedance of the antenna during connection is given by the following mathematical expression (10) by using a voltage $V_{com}$ and a current $I_{com}$ of the antenna feed unit during connection:

$$Z_{com}(\varpi) = \frac{V_{com}(\varpi)}{I_{com}(\varpi)} \quad (10)$$

In this case, an impedance $Z(\omega)$, where the impedance matching circuit in free space is used, is different from the output impedance $Z_{out}(\omega)$ at the power amplifying unit. Hence, part of the power supplied to the antenna returns to the power amplifying unit. The return ratio $\rho$ is given by the following mathematical expression (11):

$$\rho = \left| \frac{Z(\varpi) - Z_{out}(\varpi)}{Z(\varpi) + Z_{out}(\varpi)} \right|^2 \quad (11)$$

The mathematical expression (11) shows that the return loss decreases as the impedance $Z(\omega)$ during connection becomes close to the impedance in free space, thus reducing the influence owing to the impedance variation.

Accordingly, the determination of the square difference between the input impedance during connection and the input impedance in free space permits the impedance variation owing to the electromagnetic coupling between the mobile phone and a caller to be determined. The index in this case is given by the following mathematical expression (12) where $\Delta Z$ denotes an impedance variation:

$$\Delta Z = \sum_{i=1}^{N} \|Z_{com}(\varpi_i) - Z_{free}(\varpi_i)\|^2, \; i = 1, \ldots, N \quad (12)$$

In this mathematical expression (12), $\omega_i$(i=1, ... N(integer)) is given by sampling the angular frequency of the frequency band in question a finite number of times given by N. The relationship shown in the following mathematical expression (13) is established, where $\omega_{min}$ denotes the lower limit of the frequency band and $\omega_{max}$ is the upper limit of the frequency band.

$\omega_{min} < \omega_i < \omega_{Max}$, i=1, ..., N     (13)

Figure 5:
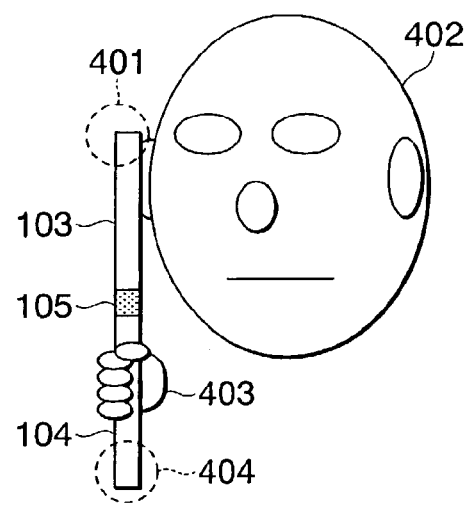
FIG. 5 is a diagram showing the relationship between the mobile phone and a caller.

The impedance variation $\Delta Z$ can be used as an evaluation index for selecting an appropriate antenna. As shown in FIG. 5, for example, an upper-antenna attachment position 401 in the upper half of the casing of the mobile phone is close to the head 402 of the caller. In the situation where a lower-antenna attachment position 404 is not covered with the hand 403 of the caller, the attachment of the antenna to the upper-antenna attachment position 401 increases the impedance variation and also increases the return loss of the power supplied to the antenna, compared with the case where the antenna is attached to the lower-antenna attachment position 404.

Figures 6A, 6B:
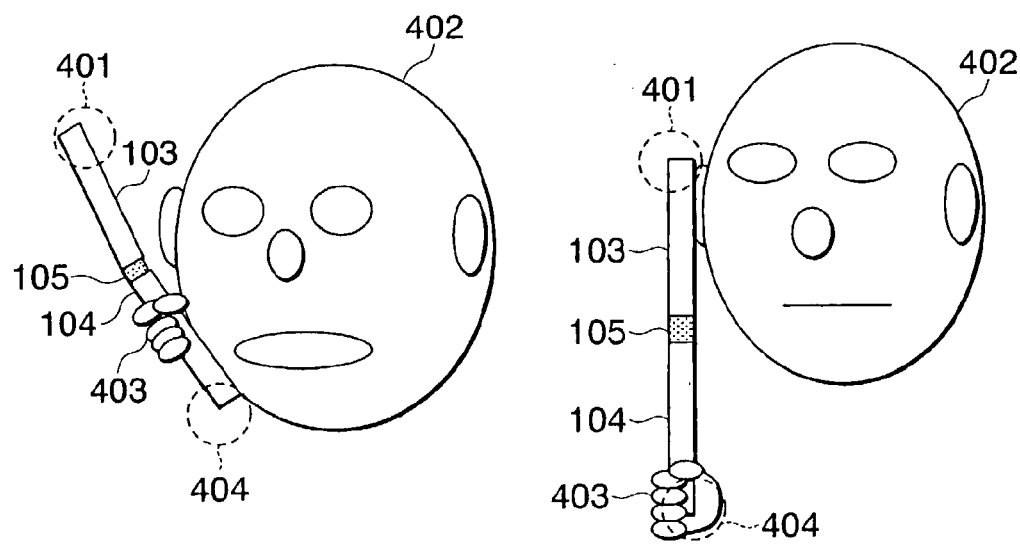
FIGS. 6A and 6B are diagrams showing the relationship between the mobile phone and the caller.

As shown in FIGS. 6A and 6B, when the lower-antenna attachment position 404 in the lower half of the casing of the mobile phone is close to the head of the caller (refer to FIG. 6A) or when the lower-antenna attachment position 404 is covered with the hand 403 of the caller (refer to FIG. 6B), the attachment of the antenna to the lower-antenna attachment position 404 increases the impedance variation and also increases the return loss of the power supplied to the antenna.

Accordingly, with the mobile phone having two antennas, one at the upper half and one at the lower half of the mobile phone (refer to FIG. 1), according to the present invention, the antenna less affected by the return loss can be selected as desired by calculating the impedance variation of the upper and lower antennas at regular time intervals during connection and using the antenna having less impedance variation for transmission. Hence, the antenna having the higher antenna gain is utilized for transmission.

Figure 7:
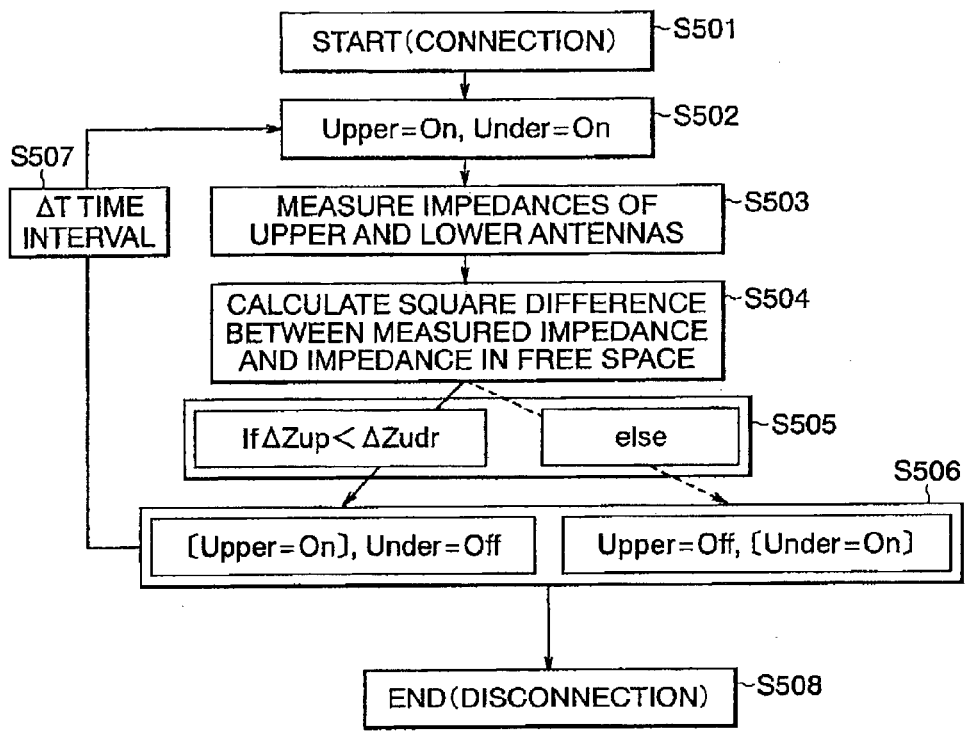
FIG. 7 is a flowchart showing the analysis process of the analysis device included in the mobile phone according to the embodiment of the present invention.

An analysis process of the mobile phone according to the embodiment of the present invention will now be described. FIG. 7 is a flowchart showing the analysis process of the analysis device included in the mobile phone according to the embodiment of the present invention.

Referring to FIG. 7, in Step S501, a mobile phone is connected. In Step S502, the upper and lower antennas are switched on and power is supplied to both antennas. In Step S503, the process measures the impedances of the upper and lower antennas. In Step S504, the process calculates the square difference between the measured impedance of the upper antenna and the impedance in free space and the square difference between the measured impedance of the lower antenna and the impedance in free space. In Step S505, the process compares the square difference of the upper impedances with the square difference of the lower impedances. When the square difference of the lower impedances is greater than that of the upper impedances, the lower antenna is switched off while the upper antenna is switched on. When the square difference of the upper impedances is greater than that of the lower impedances, the upper antenna is switched off while the lower antenna is switched on. In Step S506, power is supplied only to the antenna that is switched on. In Step S507, the process repeats Steps S502 to S506 at regular time intervals until the mobile phone is disconnected. In Step S508, the process terminates at disconnection time.

As described above, the mobile phone according to the embodiment of the present invention has two antennas and selects an antenna having an input impedance during connection that is closer to the input impedance in free space to use the selected antenna for transmission. Accordingly, it is possible to provide a mobile phone having greater antenna gain.

Although an example of the basic structure of the mobile phone of the present invention has been described, the present invention can be embodied in various improvements described below. Although two antennas are attached to the mobile phone in the above example, more than two antennas may be attached to the mobile phone. In such a case, an antenna having the least variation of the input impedance among the antennas is selected for transmission. Possible antennas include linear antennas, such as monopole antennas, helical antennas, and L antennas, and planar antennas, such as planar inverted F antennas, microstrip antennas, and slot antennas.

Figures 8A, 8B:
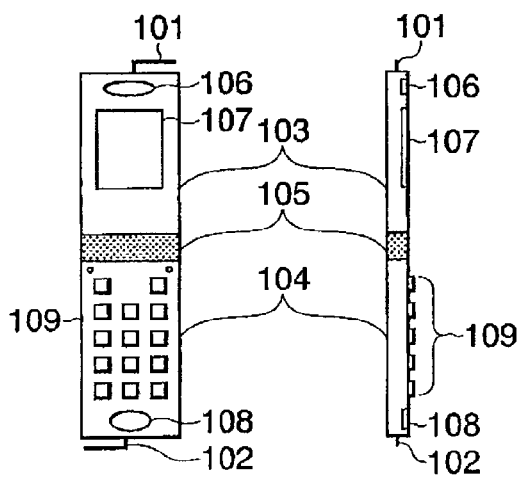
FIG. 8A is a front view of a mobile phone, according to an embodiment of the present invention, having L antennas at the upper half and the lower half.
FIG. 8B is a cross-sectional view of the mobile phone in FIG. 8A.
Figures 8C, 8D:
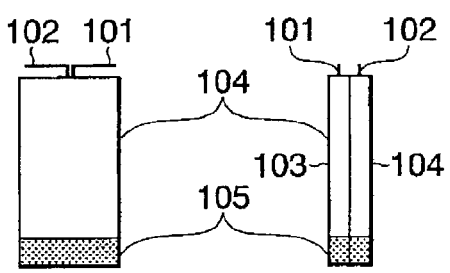
FIG. 8C is a front view of the mobile phone in FIG. 8A when the casing is closed.
FIG. 8D is a cross-sectional view of the mobile phone in FIG. 8C.

A foldable mobile phone may be characterized by an antenna structure when the casing is closed. FIG. 8A is a front view and FIG. 8B is a cross-sectional view of a foldable mobile phone having L antennas at the top and the bottom. FIG. 8C is a front view and FIG. 8D is a cross-sectional view of the foldable mobile phone when the casing is closed. As shown in FIGS. 8A and 8B where the casing is open, an upper L antenna is attached to the mobile phone in the vicinity of the center of one narrow side of the casing and a lower L antenna is attached to the mobile phone in the vicinity of the center of the other narrow side of the casing in a direction opposite to the upper L antenna. With such an antenna structure, adjustment, for example, of the positions where the antennas are attached to the mobile phone and of the length of the antennas enables an equivalent antenna having a different structure when the casing is closed to be formed.

In other words, as shown in FIGS. 8C and 8D, the antenna elements are aligned with each other when the casing is closed. For example, when two L antennas having a long side of $\lambda/4$ ($\lambda$ denotes wavelength) are used, the sum of the lengths of the aligned antennas is $\lambda/2$. Hence, this antenna behaves like a $\lambda/2$ dipole antenna. In consideration of the radiation from the antenna, the antenna has a radiation directivity pattern like a figure-of-eight. As described above, the antenna is used as a $\lambda/4$ L antenna when the casing is open; whereas the antenna may be used like a $\lambda/2$ dipole antenna when the casing is closed.

Although the mobile phone described above has the antennas at the upper half and the lower half of the casing, the antennas may be attached to any position other than the top and the bottom of the mobile phone.

According to the mobile phone of the present invention, the determination of the input impedance variation of each of a plurality of antennas attached to the mobile phone during connection and the selection of an antenna having the least input impedance variation during connection among at least two antennas attached to the casing realizes a transmission antenna that is influenced less by the return loss. Such a transmission antenna provides greater antenna gain during connection.

What is claimed is:

1. A mobile phone comprising:
   a casing that constitutes a body;
   an upper antenna at the top of the casing;
   a lower antenna at the bottom of the casing; and
   an influence-on-antenna evaluation unit for evaluating the influence of the ambient environment on each of the antennas by determining an input impedance (Z) of each antenna at predetermined time intervals during connection and by comparing the determined input impedance with a predetermined input-impedance reference value (Z0), wherein
   transmission power corresponding to the amount of radio waves radiated is supplied to the antenna that is less affected by the ambient environment and transmission power is not supplied to the antenna that is more affected by the ambient environment, and wherein;
   the variation is given by adding the square differences ($|Z(\omega_i)-Z0(\omega_i)|^2$) between input impedances ($Z(\omega_i)$) and input-impedance reference values ($Z0(\omega_i)$) at a plurality of frequency points $\omega_i$ (i=1, 2, . . . N (an integer)) within a predetermined frequency band.

2. An analysis device included in the mobile phones, the mobile phone comprising:
   a casing that constitutes a body;
   an upper antenna at the top of the casing;
   a lower antenna at the bottom of the casing; and
   an influence-on-antenna evaluation unit for evaluating the influence of the ambient environment on each of the antennas by determining an input impedance (Z) of each antenna at predetermined time intervals during connection and by comparing the determined input impedance with a predetermined input-impedance reference value (Z0), wherein transmission power corresponding to the amount of radio waves radiated is supplied to the antenna that is less affected by the ambient environment and transmission power is not supplied to the antenna that is more affected by the ambient environment, wherein
the input-impedance reference value (Z0) is the impedance of an antenna located in free space,
wherein the analysis comprises:
a free-space-impedance storage unit for storing in advance the input-impedance reference value (Z0) of an antenna in free space;
an upper-impedance calculation unit for calculating the input impedance of the upper antenna during connection;
a lower-impedance calculation unit for calculating the input impedance of the lower antenna during connection;
an upper-impedance-variation calculation unit for calculating the square difference between the input impedance of the upper antenna and the input-impedance reference value in free space;
a lower-impedance-variation calculation unit for calculating the square difference between the input impedance of the lower antenna and the input-impedance reference value in free space;
a comparison unit for comparing an upper-impedance variation calculated by the upper-impedance-variation calculation unit with a lower-impedance variation calculated by the lower-impedance-variation calculation unit; and
a switch unit for switching on or off the upper antenna and the lower antenna, wherein the switch unit supplies power only to the lower antenna by transferring no power from a power amplifying unit to a feed unit in the upper antenna when the upper-impedance variation is greater than the lower-impedance variation based on the comparison result given by the comparison unit, and wherein
the switch unit supplies power only to the upper antenna by transferring no power from the power amplifying unit to the lower antenna when the lower-impedance variation is greater than the upper-impedance variation.

3. An analysis device according to claim 2, wherein:
the upper antenna and the lower antenna are inverted L antennas.

4. An analysis device according to claim 2, wherein:
the upper antenna and the lower antenna are helical antennas.

5. An analysis device according to claim 2, wherein:
the upper antenna and the lower antenna are monopole antennas.

6. An analysis method of the mobile phone, the mobile phone comprising a casing that constitutes a body; an upper antenna at the top of the casing; a lower antenna at the bottom of the casing: and an influence-on-antenna evaluation unit for evaluating the influence of the ambient environment on each of the antennas by determining an input impedance (Z) of each antenna at predetermined time intervals during connection and by comparing the determined input impedance with a predetermined input-impedance reference value (Z0), wherein transmission power corresponding to the amount of radio waves radiated is supplied to the antenna that is less affected by the ambient environment and transmission power is not supplied to the antenna that is more affected by the ambient environment, wherein
the input-impedance reference value (Z0) is the impedance of an antenna located in free space,
the method comprising:
a free-space-impedance storage step for storing the input-impedance reference value (Z0) of an antenna in free space;
an upper-impedance calculation step for calculating the input impedance of the upper antenna during connection;
a lower-impedance calculation step for calculating the input impedance of the lower antenna during connection;
an upper-impedance-variation calculation step for calculating the square difference between the input impedance of the upper antenna and the input-impedance reference value in free space;
a lower-impedance-variation calculation step for calculating the square difference between the input impedance of the lower antenna and the input-impedance reference value in free space;
a comparison step for comparing an upper-impedance variation calculated by the upper-impedance-variation calculation step with a lower-impedance variation calculated by the lower-impedance-variation calculation step; and
a switching step for switching on or off the upper antenna and the lower antenna, and wherein
in the switching step, power is supplied only to the lower antenna by transferring no power from a power amplifying unit to a feed unit in the upper antenna when the upper-impedance variation is greater than the lower-impedance variation based on the comparison result given by the comparison step, and wherein
in the switching step, power is supplied only to the upper antenna by transferring no power from the power amplifying unit to the lower antenna when the lower-impedance variation is greater than the upper-impedance variation.

7. An analysis method of the mobile phone, according to claim 6, wherein:
the upper antenna and the lower antenna are inverted L antennas.

8. An analysis method of the mobile phone, according to claim 6, wherein:
the upper antenna and the lower antenna are helical antennas.

9. An analysis method of the mobile phone, according to claim 6, wherein:
the upper antenna and the lower antenna are monopole antennas.

* * * * *